United States Patent
Ventrone et al.

(10) Patent No.: US 11,054,854 B1
(45) Date of Patent: Jul. 6, 2021

(54) SYSTEM AND METHOD TO DRIVE LOGIC CIRCUIT WITH NON-DETERMINISTIC CLOCK EDGE VARIATION

(71) Applicant: GLOBALFOUNDRIES U.S. Inc., Santa Clara, CA (US)

(72) Inventors: Sebastian T. Ventrone, South Burlington, VT (US); Johnatan Kantarovsky, South Burlington, VT (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 17/032,027

(22) Filed: Sep. 25, 2020

(51) Int. Cl.
*G06F 1/08* (2006.01)
*G06F 21/75* (2013.01)
*H03K 3/84* (2006.01)
*H03K 3/037* (2006.01)
*H03K 5/01* (2006.01)
*H03K 5/00* (2006.01)

(52) U.S. Cl.
CPC .............. *G06F 1/08* (2013.01); *G06F 21/75* (2013.01); *H03K 3/037* (2013.01); *H03K 3/84* (2013.01); *H03K 5/01* (2013.01); *H03K 2005/00078* (2013.01)

(58) Field of Classification Search
CPC .. G06F 1/08; G06F 21/75; H03K 3/84; H03K 3/037; H03K 5/01; H03K 2005/00078
USPC ....................................................... 327/225
See application file for complete search history.

(56) References Cited

U.S. PATENT DOCUMENTS

| 7,475,311 B2 * | 1/2009 | Kiryu ............. G01R 31/318536 714/25 |
| 10,489,611 B2 * | 11/2019 | Rivoir .................... G06F 21/755 |
| 2008/0046772 A1 | 2/2008 | Arsovski et al. |
| 2011/0260749 A1 * | 10/2011 | Deas ...................... G06F 21/556 326/8 |
| 2011/0285420 A1 * | 11/2011 | Deas ...................... G06F 21/725 326/8 |
| 2011/0285421 A1 * | 11/2011 | Deas ...................... H04L 7/0337 326/8 |

OTHER PUBLICATIONS

J.E. Schroeder et al, "Latch-Up Elimination in Bulk CMOS LSI Circuits," IEEE Transactions on Nuclear Science, vol. NS-27, No. 6, Dec. 1980, pp. 1735-1738.

* cited by examiner

*Primary Examiner* — Ryan Jager
(74) *Attorney, Agent, or Firm* — Hoffman Warnick LLC (57) ABSTRACT

Embodiments of the disclosure provide systems and methods to operate a logic circuit with non-deterministic clock edge variations. A system may include a clock coupled to a logic circuit, the logic circuit having a set of source latches coupled to a set of capture latches through a set of logic cones. The clock includes a fixed clock component configured to generate a clock signal having a first clock edge, and a jitter clock component coupled to the fixed clock component and configured to modify the clock signal to have a second clock edge based on a non-deterministic value. The clock transmits the clock signal with the second clock edge to drive the set of source latches and the set of capture latches of the logic circuit. A clock controller coupled to the jitter clock component generates the non-deterministic value.

20 Claims, 6 Drawing Sheets

SYSTEM AND METHOD TO DRIVE LOGIC CIRCUIT WITH NON-DETERMINISTIC CLOCK EDGE VARIATION

TECHNICAL FIELD

Embodiments of the disclosure relate generally to the operating of logic circuits. More specifically, embodiments of the disclosure provide systems and methods to drive a logic circuit with non-deterministic clock edge variation, thereby hiding internal functions of a product from various forms of external analysis.

BACKGROUND

A growing concern in the realm of integrated circuit (IC) technology is the susceptibility of a product to external analysis of the product's functions in an active state. Such analysis may be known as an "active attack" on a product. Active attacks may be implemented by analysis of voltage contrast across portions of a product while it operates. Active attacks rely on repetitive cycling of various functions, and observing targeted energy potential within targeted circuits. The observations may be performed, e.g., using a scanner such as an X-ray machine.

During an active attack, the analyzer may capture several samples of circuit operations over a given time span. The X-ray analysis of the samples may indicate logic values (e.g., high and low voltages) on connections between portions of a product. The logic values can be correlated to clock edges that operate via a deterministic time sample. Such a correlation is achieved by automating trigger times of the X-ray analysis based on the clock frequency of the device under analysis. Active attacks have proven effective for reverse engineering many logic states within a device. The logic states of the active circuits cannot be determined merely by analyzing an inactive device.

SUMMARY

Aspects of the disclosure provide a system including: a clock coupled to a logic circuit, the logic circuit having a set of source latches coupled to a set of capture latches through a set of logic cones, wherein the clock includes: a fixed clock component configured to generate a clock signal having a first clock edge, and a jitter clock component coupled to the fixed clock component and configured to modify the clock signal to have a second clock edge based on a non-deterministic value, wherein the clock transmits the clock signal with the second clock edge to drive the set of source latches and the set of capture latches of the logic circuit; and a clock controller coupled to the jitter clock component, wherein the clock controller generates the non-deterministic value.

Further aspects of the disclosure provide an integrated circuit (IC) structure, including: a set of source latches configured to propagate an input logic signal; a set of logic cones coupled to the set of source latches, and configured to convert the input logic signal into an output logic signal via one of a plurality of signal paths; a set of capture latches coupled to the set of logic cones, and configured to process the output logic signal from the set of logic cones; a clock coupled to the set of source latches and the set of capture latches, the clock including: a fixed clock component configured to generate a clock signal having a first clock edge, and a jitter clock component coupled to the fixed clock component and configured to modify the clock signal to have a second clock edge based on a non-deterministic value, wherein the clock transmits the clock signal with the second clock edge to drive the set of source latches and the set of capture latches; and a clock controller coupled to the jitter clock component, wherein the clock controller generates the non-deterministic value.

Additional aspects of the disclosure provide a method including: generating a clock signal having a first clock edge; generating a non-deterministic value via a clock controller; modifying the clock signal from the first clock edge to a second clock edge based on the non-deterministic value; and transmitting the clock signal with the second clock edge to a logic circuit having a set of source latches coupled to a set of capture latches through a set of logic cones, such that the clock signal with the second clock edge drives each of the set of source latches and the set of capture latches.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the present disclosure provide systems and methods to drive the operation of a logic circuit with non-deterministic clock edge variations. Clock edges refer to the rising and falling edge of voltages within a clock signal for driving the operation of a logic circuit. The non-deterministic clock edge variation may reduce the susceptibility of an integrated circuit to active attacks, e.g., by making it difficult or impossible when to trigger an X-ray capture of voltage states within logic circuits of a product. Systems according to the disclosure provide a clock coupled to a logic circuit. The logic circuit includes a set of source latches coupled to a set of capture latches through a set of logic cones. The timing of clock edges transmitted to the logic circuit affect which logic cones will transmit signals to the set of capture latches.

The clock may include a fixed clock component for generating a clock signal with a first clock edge (i.e., a set of rising and falling signals at respective instances in time), and a jitter clock component coupled to the fixed clock component for modifying the clock signal to have a second clock edge (i.e., rising and falling signals at different instances in time, but at substantially the same frequency). In some implementations, A clock control system is coupled to and/or included within the jitter clock controller to generate a non-deterministic number ("N") of delayed clocks, so that the clock going to the latch is shifting relative edges cycle to cycle. The non-deterministic control system will select which delayed clock creating a difference between clock signal with the first clock edge and the second clock edge cycle to cycle. The clock transmits the clock value with the second clock edge to drive the set of source latches and the set of capture latches. In this configuration, a capture device such as an X-ray cannot reliably trigger its sampling of the logic circuit in alignment with the clock edge variations. Embodiments of the disclosure thereby obfuscate the function of logic circuits coupled to the clock and clock controller.

Figure 1:
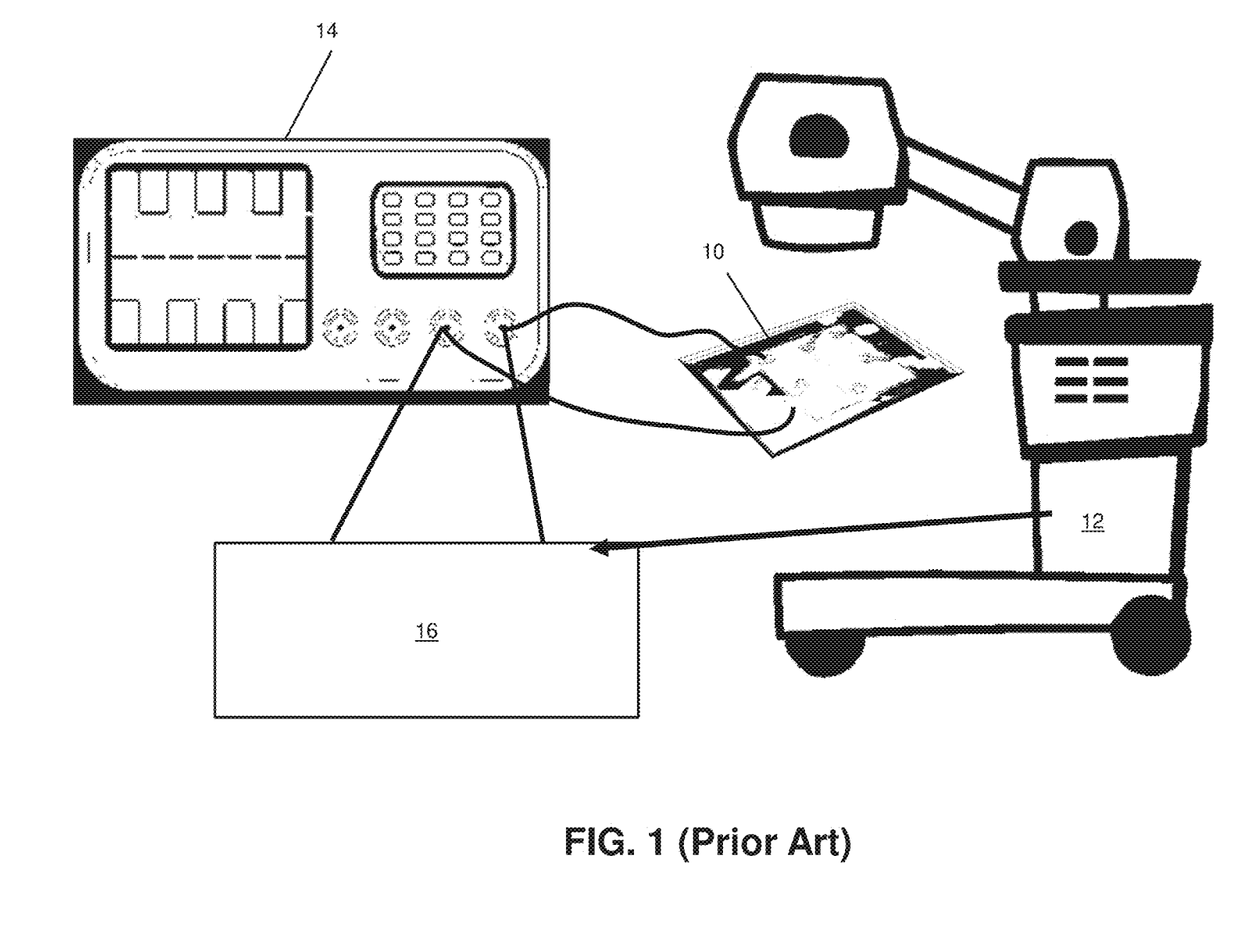
FIG. 1 shows an example apparatus for conducting an active attack on a product, via an X-ray device.

FIG. 1 depicts an example of how an attacker may attempt to analyze the functions of a device 10, e.g., using a scanner 12 (e.g., an X-ray machine). It is understood that scanner 12 may also include other types of imaging tools (e.g., thermal imaging devices) in other types of attacks or settings. Device 10 may be in the form of a single logic circuit and/or a partial or complete device with multiple logic circuits to be analyzed. Scanner 12 may be configured to capture images of device 10 as it operates. An oscilloscope 14 or similar electrical tool may be connected to device 10. Oscilloscope 14 may generate a supply voltage and/or other inputs to drive clock signals within device 10, and thus causes device 10 to operate in an active state.

An attack controller 16 can be electrically coupled to device 10 through oscilloscope 14 in an attempt to force device 10 to perform various logic functions. Attack controller 16 may also be electrically coupled to scanner 12 to trigger X-ray image captures of device 10 during its operation. In this manner, attack controller 16 can control each of device 10, scanner 12, and/or oscilloscope 14, to analyze the voltage state of device 10 while it operates. In this configuration, it is possible for attack controller 16 to derive logical functions of device 10 by triggering scanner 12 synchronously with clock edges that are pulsed by a clock internal to, or otherwise connected to, device 10. Embodiments of the disclosure provide systems and methods which protect logic circuits (e.g., those in device 10) from being detected and analyzed by attack controller 16 and interconnected elements (e.g., scanner 12 and oscilloscope 14).

Figure 2:
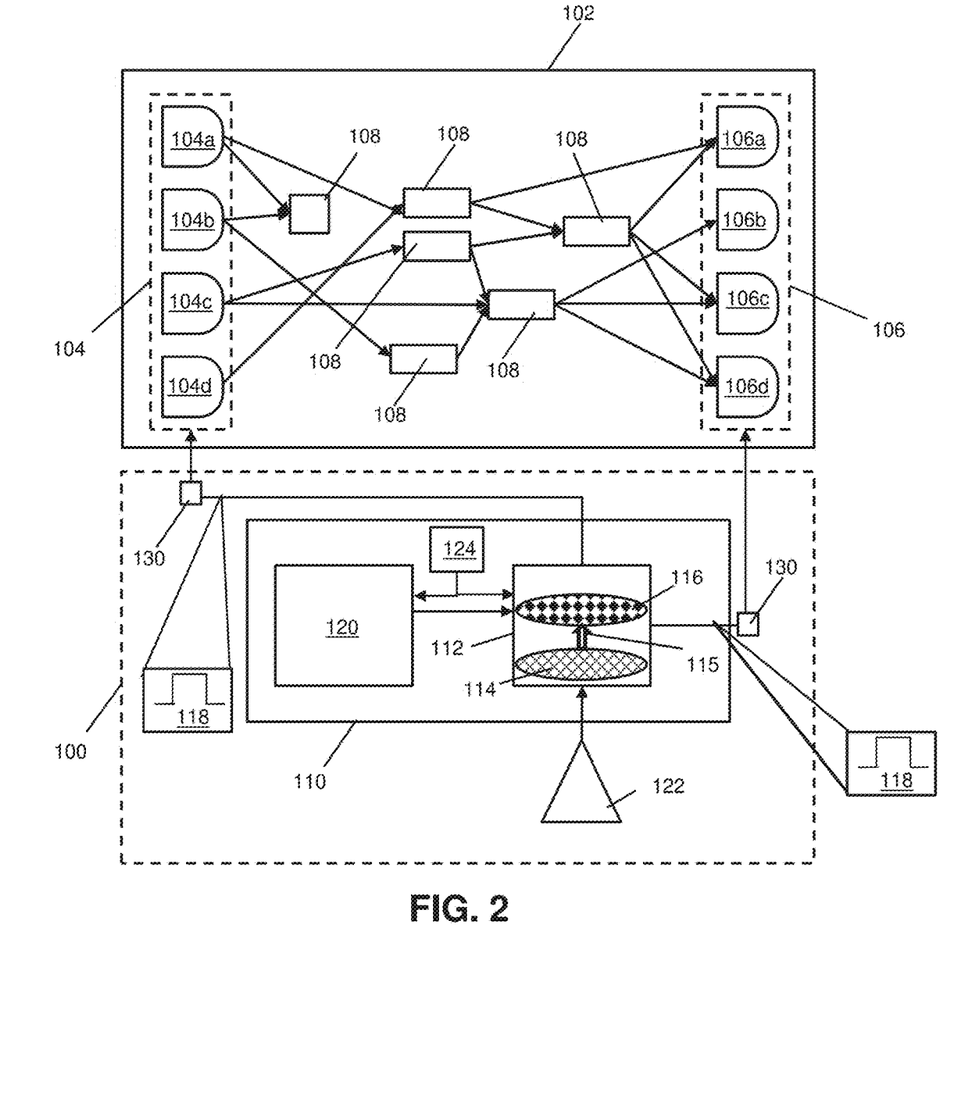
FIG. 2 shows a schematic view of a system for driving a logic circuit with non-deterministic clock edge variation according to embodiments of the disclosure.

Referring to FIG. 2, a system 100 according to embodiments of the disclosure is shown operatively coupled to a logic circuit 102. Logic circuit 102 may include a set of source latches 104 for propagating an input logic signal through logic circuit 102. Source latches 104 may be coupled to a set of capture latches 106 through a set of logic cones 108. Logic cones 108 are arranged to convert the input logic signal(s) propagated from source latches 104 to one or more corresponding output logic signals via a corresponding signal path. The signal path through logic cones 108 may be dependent on the signal information to be processed and/or the clock edges of a clock signal that drives logic circuit 102. Capture latches 106 in logic circuit 102 may receive the output logic signals from set of logic cones 108 for processing and delivery to other elements.

Set of source latches 104 can have multiple distinct latches 104a, 104b, 104c, 104d. Set of capture latches 106 can also have multiple distinct latches 106a, 106b, 106c, 106d. The total number of latches in each set of latches 104, 106 can vary from product to product, and in some cases logic circuit 102 may include hundreds or thousands of latches in each set of latches 104, 106. Logic circuit 102 may be part of any conceivable circuit configured to transmit data in the form of a serial or parallel data string, and more specifically may be included in all or part of a product such as device 10 (FIG. 1). Source latches 104 and capture latches 106 may take the form of a digital memory circuit for recording a high or low voltage value (i.e., a "zero" or "one"). Each latch within source latches 104 and capture latches 106 may take the form of any circuit that has two stable states and can be used to store state information, including various types of digital memory.

Logic cones 108 may be one or more logic gates configured to receive logic signals from source latch(es) 104 and/or other logic cones 108 to implement various functions. Such functions may include fundamental logic (e.g., "or," "and," "exclusive or," "exclusive and," "negative or," "negative and," etc.) and/or combinations of these functions. Set of capture latches 106 may receive and/or store the output from logic cones 108 for processing and transmittal to other portions of device. Such portions may be within, or outside of, logic circuit 102. The structure and function of source latches 104 and capture latches 106 is well-understood in the field and thus not described in further detail.

System 100 may interact with, or may be part of, logic circuit 102 to impede an active attack. System 100 can include a variable control system 110 with a clock 112 for providing a digital clock input (e.g., a periodic high-low waveform having a predetermined frequency, and respective clock edges at distinct instances) to logic circuit 102. Logic circuit 102 may be configured to operate using a clock signal transmitted thereto from clock 112. Unlike conventional clock mechanisms for logic circuit 102, clock 112 in embodiments of the disclosure provides a clock signal in which the clock edges are non-deterministic (e.g., random) to drive logic circuit 102. Clock 112 is thus capable of causing logic signals to be propagated from source latches 104 to set of capture latches 106 at non-deterministic times. Variable control system 110 can provide some control over the clock edges of a signal transmitted to logic circuit 102. The non-deterministic value for creating clock edge variations may impede or prevent devices such as attack controller 16 (FIG. 1) from being able to trigger detection tools (e.g., scanner 12) synchronously with the propagation and capturing of logic signals. The term "non-deterministic value," as used herein, may refer to a random value, but also need not refer to a mathematically pure random value. Other types of numerical values determined without input from a user (e.g., pseudo-random values) or other mechanisms for providing a non-deterministic numeric output, may be used to create a "non-deterministic value" as discussed herein.

To produce clock signals with varying clock edges, clock 112 of variable control system 110 can include multiple components for producing a signal with clock edges that are non-deterministic but still within a jitter limit for logic circuit(s) 102 connected thereto. Clock 112 may include, e.g., a fixed clock component 114 for generating a clock signal 115 having a first (e.g., initial) clock edge. The first clock edge in clock signal 115 may be a predetermined specification instance in which logic circuit 102 will detect rising and/or falling edges for logic cycling, and/or may be a signal propagation with the lowest possible amount of jitter. Fixed clock component 114 may include or otherwise may be coupled to a clock generator (e.g., one or more electronic oscillators such as a crystal oscillator or any type of local oscillator "LO" circuit on a device) for driving and synchronizing the operation of logic circuit 102. Fixed clock component 114 may include various subcomponents, e.g., a resonant circuit, amplifier, power supply coupling, etc., for producing a waveform at a desired frequency. Clock signal 115 generated with fixed clock component 114 may be deterministic, i.e., the clock edges of its generated clock signals do not vary based on input signals to clock 112.

Clock 112 may also include a jitter clock component 116 operatively coupled to fixed clock component 114. Jitter clock component 116 may lack a clock generator or similar oscillation circuit, and instead may be a distinct circuit for altering the clock edges of the signal (e.g., changing their instances without affecting frequency) based on a non-deterministic value. Jitter clock component 116 thus may change the timing of clock edges emitted from clock 112, e.g., by using a non-deterministic value to vary the outgoing edges from the original clock edges. "Jitter" refers to the timing displacement (i.e., phase difference) between two instances of a clock signal with two different sets of clock edges, without differences in the frequency or amplitude of a signal. In some implementations, jitter clock component 116 may be component for intentionally jittering the clock signal by delaying it by a non-deterministic (e.g., random) amount of time (measured, e.g., in nanoseconds). Jitter clock component 116 thus causes clock 112 to emit a clock signal 118 with a second clock edge, and the emitted clock signal 118 is transmitted to logic circuit 102, as discussed elsewhere herein.

A clock controller 120 may be operatively coupled to jitter clock component 116 to provide non-deterministic values for determining the amount of jitter, i.e., variation between the first and second clock edges. Clock controller 120 thus may take the form of any currently known or later developed instrument for generating non-deterministic variables, which may be randomly generated, pseudo-randomly generated, and/or generated by any mechanism that an observer cannot accurately predict. Such instruments may include, e.g., a random number generator (RNG), pseudo-random number generator (PRNG) in the form of a digital circuit for generating random values based on any conceivable function, algorithm, etc. In further implementations, clock controller 120 may include or take the form of a physical unclonable function (PUF), a physical object that produces a unique output in response to various inputs. As a result of their unique output(s), PUFs may produce seemingly-random outputs in response to incoming voltage signals. The incoming voltage signals, in turn, may themselves be transmitted by an RNG or similar element to provide more variation in the non-deterministic values from clock controller 120.

Clock 112 optionally may include, or be coupled to, various components for acting on jitter clock component 116 without regard to the non-deterministic value from clock controller 120. Such components may control or limit the extent to which jitter clock component 116 modifies the clock signal from fixed clock component 114. In an example, clock 112 may be coupled to a jitter switch 122 for selectively enabling or disabling jitter clock component 116 as system 100 operates. In a simplistic example, jitter switch 122 may take the form of an electrical switch, fuse, transistor, and/or similar element for controlling whether jitter clock component 116 will modify the clock edges in a signal emitted from fixed clock component 114 before it travels to logic circuit 102. In further examples, jitter switch 122 may be a separate controller for detecting and/or issuing commands to obfuscate the function of logic circuit 102 by enabling jitter clock component 116, and/or causing logic circuit 102 to operate without clock edge variation by disabling jitter clock component 116.

However embodied, jitter switch 122 may control whether system 100 affects the operating frequency of logic circuit 102 based on whether a manufacturer wishes to hide its functions. Jitter switch 122 may enable or disable jitter clock component 116 during the manufacture of a product, and/or after field deployment. More specifically, jitter switch 122 may receive a command to obfuscate logic circuit 102 (e.g., from a user or manufacturer) and in response may enable jitter clock component 116 to vary the clock edges in clock signals 118 transmitted to source latches 104 and capture latches 106. In some cases, jitter switch 122 may be omitted entirely such that jitter clock component 116 always operates.

System 100 and/or clock 112 may also include a jitter controller 124 operatively coupled to jitter clock component 116 and/or clock controller 120 for ensuring that the amount of jitter in the clock signal remains below a target. In the case of jitter controller 124 being coupled to clock controller 120, jitter controller 124 may limit the non-deterministic value(s) from clock controller 120 such that they produce at least a minimum frequency for operating logic circuit 102. In the case of jitter controller 124 being coupled to clock 112, jitter controller 124 may decrease the amount of variation between first and second clock edges. During operation, clock controller 120 and/or jitter controller 124 may calculate a jitter limit for clock signal 118 based on one or more properties of logic circuit 102 (e.g., the arrangement of logic cones). Once the jitter limit is calculated, clock controller 120 may generate the non-deterministic value and/or jitter clock component 116 may generate clock signal 118 to prevent the jitter limit from being exceeded.

Clock 112 may generate clock signal 118 with varying clock edges to drive various components of logic circuit 102. More specifically, clock signal 118 with the second (i.e., non-deterministic) clock edge can be transmitted to source latches 104 in addition to capture latches 106. By this arrangement, system 100 can ensure each set of latches 104, 106 will propagate and capture signals as desired even after jitter clock component 116 has modified the initial clock edges from their values as transmitted by fixed clock component 114. An operator of logic circuit 102 may wish to delay the transmitting of clock signals 118 to each set of latches 104, 106. In this case, system 100 may include one or more clock buffers 130 coupled between clock 112 and source latches 104 and/or capture latches 106 to delay (e.g., by a predetermined number of milliseconds) the propagation of clock signal 118 to logic circuit 102. A buffer is an electrical component that does not affect the amplitude, frequency, and/or other attributes of electrical signals passing therethrough, but simply delays the travel time from one element to another. In one example, each clock buffer 130 may include an "and" gate" with a group of serially coupled inverters coupled to one terminal, such that a signal will not pass through clock buffer 130 until it passes through all of the inverters. Clock buffers 130 may or may not be identical, the delay in each buffer may be selected such that clock signals 118 emitted from clock 112 reach source latches 104 and capture latches 106 at substantially the same time.

Figure 3:
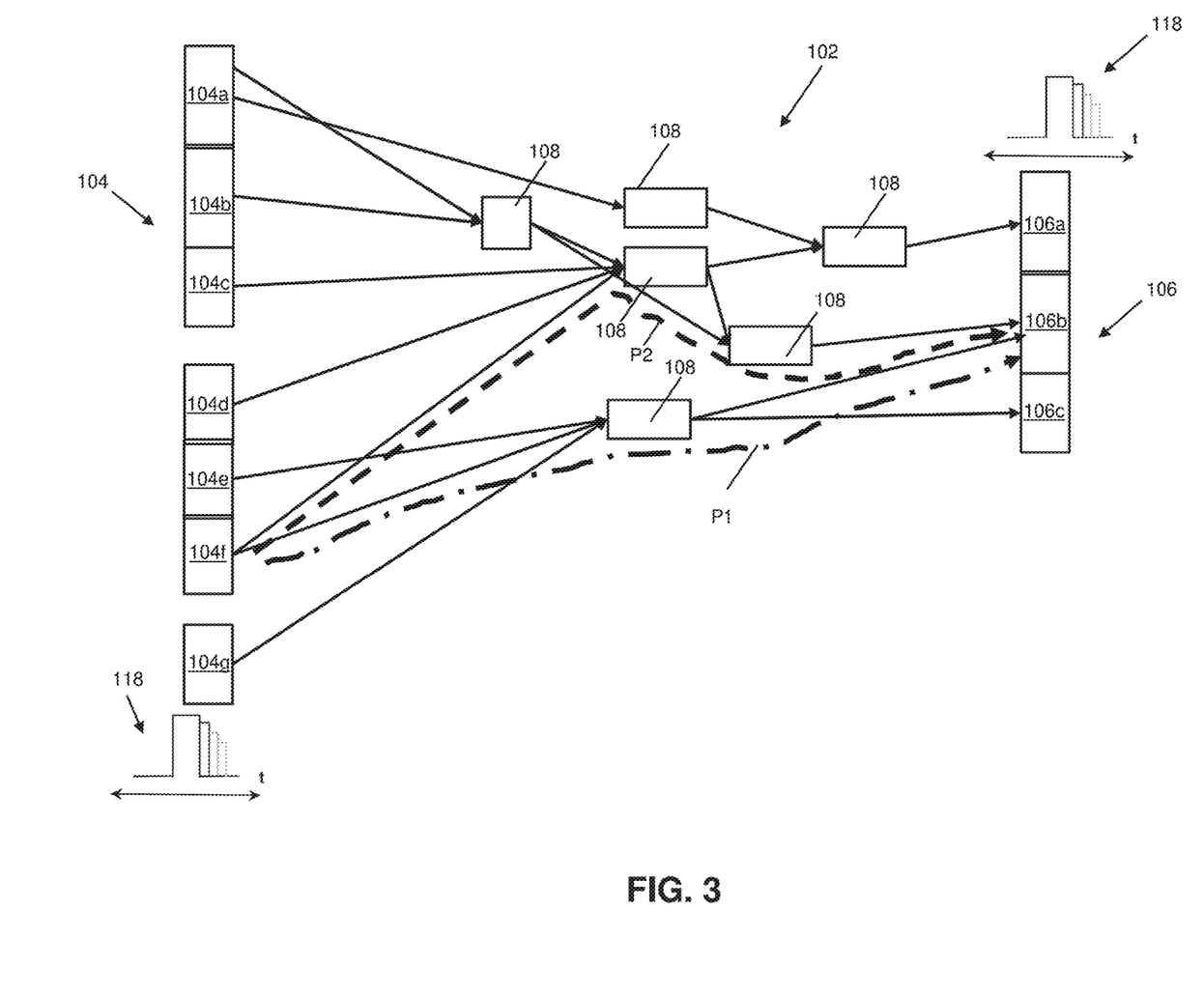
FIG. 3 provides an expanded view of signal pathways from a set of source latches to a set of capture latches through logic cones in embodiments of the disclosure.

Turning to FIG. 3, an expanded view of logic circuit 102 provides an example of the effects of system 100 may have on logic circuit 102 operation. In the FIG. 3 example, a set of latches 104 of seven source latches 104a-104g may propagate logic signals to a set of latches 106 of three capture latches 106a-106c through several logic cones 108 (e.g., six in the FIG. 3 example). The pathways from set of source latches 104 to set of capture latches 106 are not fixed with respect to the clock edges of the clock signal transmitted to logic circuit 102. That is, the structure and couplings across logic cones 108 may cause logic signals to propagate along one path with clock signals 118 having one set of clock edges, but along different paths at the same frequency but different clock edges. Thus, logic circuit 102 includes non-deterministic logic paths that depend at least partially on the clock edges of clock signals 118 for driving set of source latches 104 and set of capture latches 106. The difference in paths ensures that data can be accurately propagated from source latches 104 and recorded in capture latches 106 in compliance with timing requirements.

FIG. 3 provides an example two timing paths P1, P2 from source latch 104 to capture latch 106b through set of logic cones 108. System 100 (FIG. 2) and logic circuit 102 may be structured to accommodate the second (i.e., non-deterministic) clock edges in clock signals 118 emitted from clock 112. This may be ensured via design and timing analysis of logic circuit 102 to provide a slack that accommodates clock signals 118 with different clock edges. The term "slack" refers to a difference between the arrival time (expressed, e.g., deterministically or statistically) of a logic signal to a particular merge point (e.g., one of capture latches 106a-c) from an input (e.g., one of source latches 104a-104g), and the required arrival time for the merge point. The term "propagation time" refers to the amount of time it takes for a signal to travel from the input to the merge point.

In the FIG. 3 example, logic signals may propagate through logic circuit 102 via timing path P1 when the clock signal is propagated with the first clock edge, but may propagate through logic circuit 102 via timing path P2 with the second clock edge. In either circumstance, the slack of paths P1, P2 may be greater than the total propagation time needed for a clock signal to travel from set of source latches 104 to set of capture latches 106. Thus, logic signals traveling through logic circuit 102 will take different pathways with different clock edges while still implementing the functions of logic circuit 102. Thus, system 100 producing clock signals 118 with clock edge variation will cause signals to take non-deterministic pathways through logic circuit 102 and at different time intervals. This may impede an attacker from recognizing when to trigger an instrument such as scanner 12 (FIG. 1), and from understanding the functions that logic circuit 102 implements.

Figure 4:
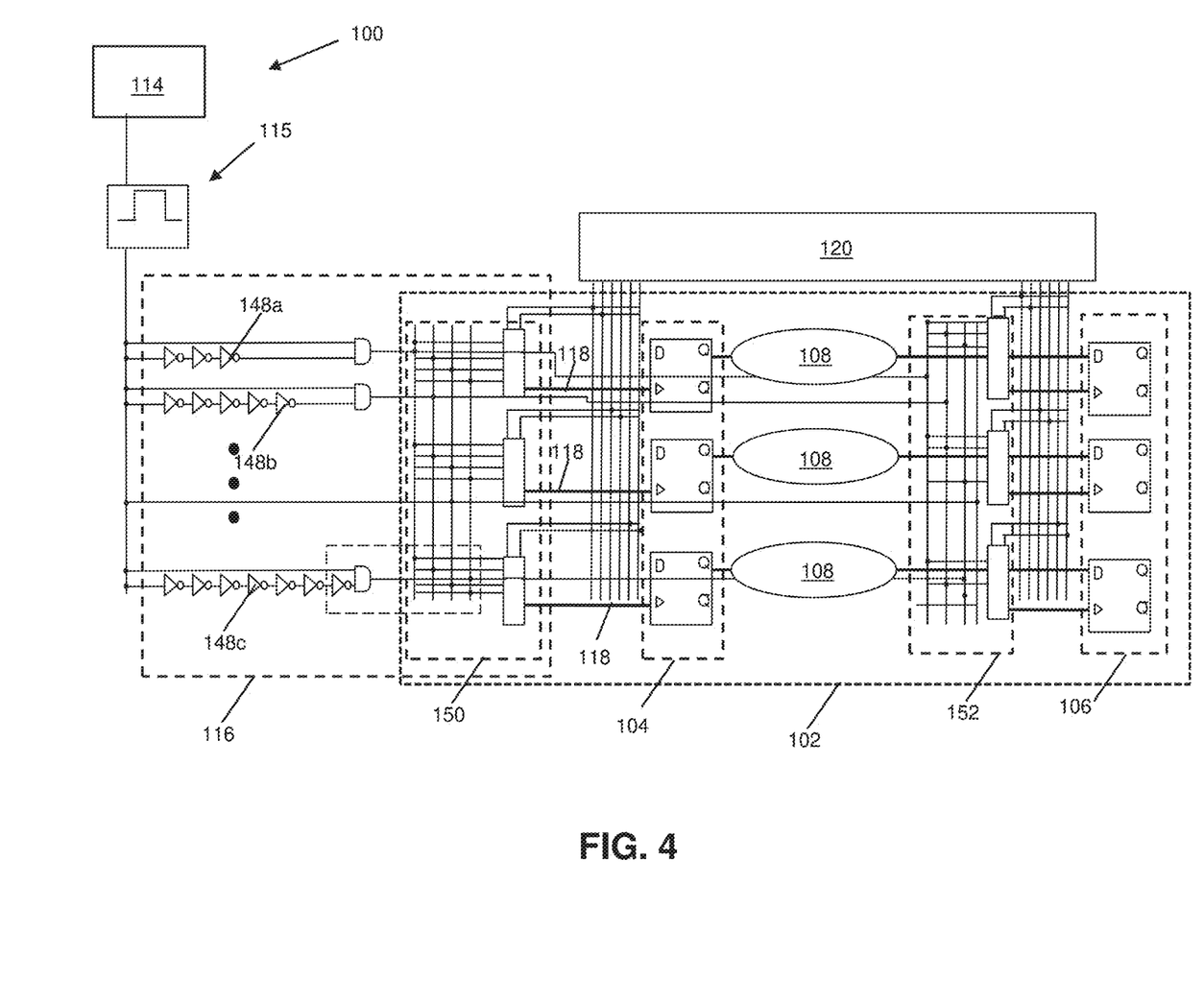
FIG. 4 provides a digital circuit schematic of a system for driving a logic circuit with non-deterministic clock edge variations according to embodiments of the disclosure.
Figure 5:
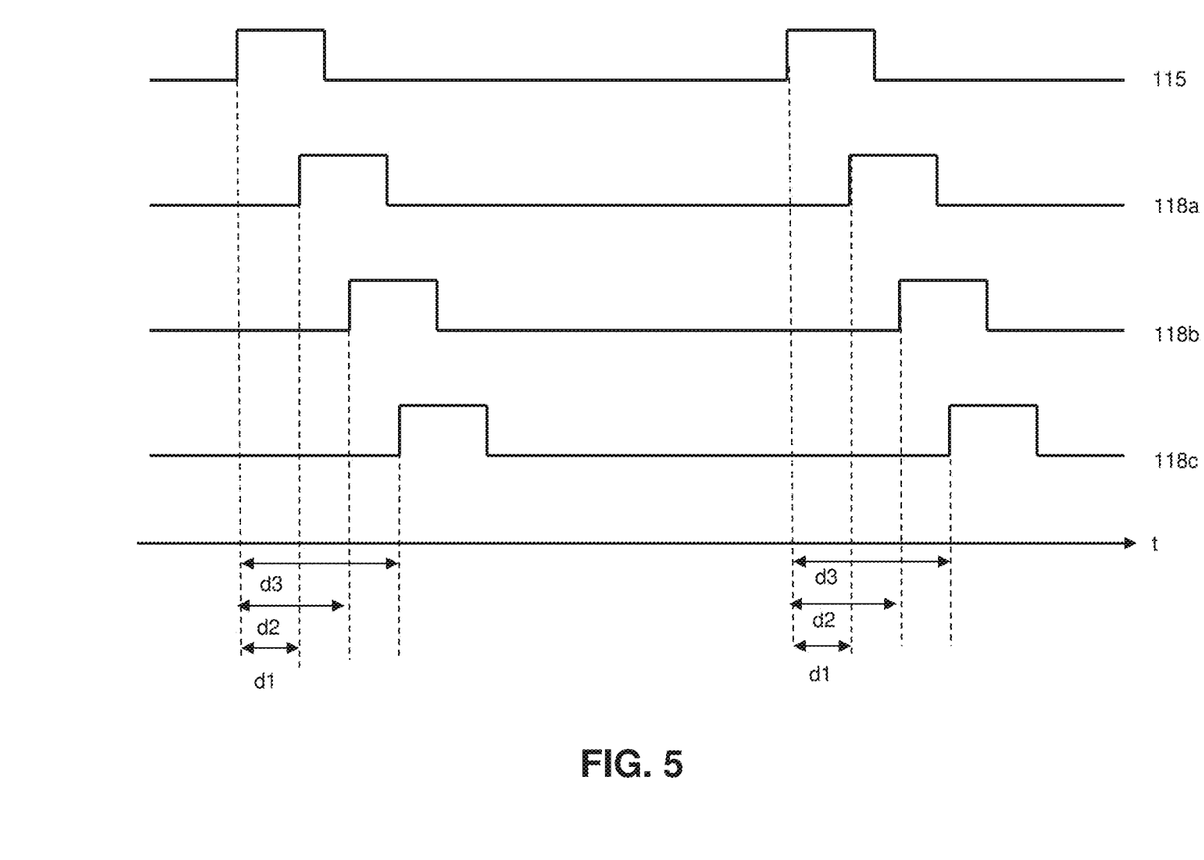
FIG. 5 provides a comparative clock diagram illustrating an initial clock C1 and three possible delay clocks selectable in embodiments of the disclosure.

Turning to FIGS. 4 and 5, digital circuitry for varying the amount of jitter in clock signal 118 is discussed. A digital circuit schematic of system 100 and logic circuit 102 is shown in FIG. 4, while FIG. 5 shows an example of three possible clock signals 118a, 118b, 118c that can be generated via the embodiment of system 100 shown in FIG. 4. Fixed clock component 114 may produce clock signal 115 with a predetermined first clock edge. Clock signal 115, in turn, may be transmitted to jitter clock component 116. As discussed herein, jitter clock component 116 will convert clock signal 115 with a first clock edge to clock signal 118 with a second clock edge for transmission to source latches 104. Clock controller 120 may provide the non-deterministic values used to control the amount of jitter in clock signal 118 transmitted to logic circuit 102. According to one example, jitter clock component 116 can separate clock signal 115 into three different clock signals using respective delay buffers 148a, 148b, 148c. Although three delay buffers 148a, 148b, 148c are provided as an example, any number of delay buffers may be included. Each delay buffer provides a respective clock signal 118a, 118b, 118c (FIG. 5), representing one of a group of possible clock signals to be output from jitter clock component 116. Clock signals 118a, 118b, 118c, in turn, have different amounts of time delay d1, d2, d3, relative to the clock edges of clock signal 115. It is thus understood that all of the possible clock signals 118a, 118b, 118c will be generated in jitter clock component 116 without regard to the non-deterministic value output from clock controller 120. Jitter clock component 116 can also include a demultiplexer ("demux") 150 for selecting one of the multiple clock signals 118a, 118b, 118c for transmission as clock signal 118 to source latches 104. Clock controller 120 thus uses the non-deterministic value to cause demux 150 to choose only one of the multiple clock signals, and hence a respective amount of jitter, to drive logic circuit 102.

Set of source latches 104, as driven by clock signals 118a, 118b, 118c, may propagate through logic cones 108 to set of capture latches 106. Set of capture latches 106, in turn, may be coupled to a multiplexer 152 ("mux"). Mux 152 may be electrically coupled to clock controller 120, such that the same non-deterministic value provided to demux 150 also causes mux 152 to receive and process outcoming logic signals at the speed of the selected clock signal 118, regardless of the mechanism for generating a non-deterministic value to select one clock signal 118a, 118b, 118c. Mux 152 thereafter provides the outgoing data to capture latches 106. Thus, the functions of logic circuit 102 can be driven by the selected clock edges of clock signal 118, but without interfering with the intended function of logic circuit 102.

Figure 6:
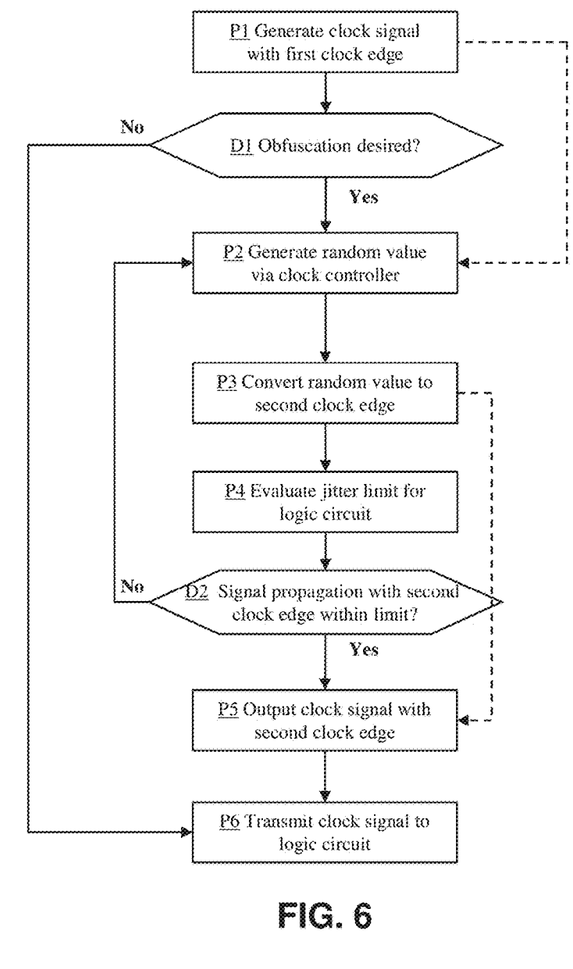
FIG. 6 provides an example flow diagram of a method for driving a logic circuit with non-deterministic clock edge variations according to embodiments of the disclosure.

Referring now to FIGS. 2 and 6 together, embodiments of the disclosure provide a method to drive logic circuit 102 at with clock edge variation, e.g., using system 100 according to embodiments of the disclosure. In process P1 according to embodiments of the disclosure, fixed clock component 114 of clock 112 may generate a clock signal with a first clock edge. The method may then proceed to decision D1, in which variable control system 110 determines whether obfuscation of signals through logic circuit 102 is desired. Decision D1 may include, e.g., detecting or not detecting a signal from jitter switch 122, jitter switch 122 being placed in an on or off position, and/or other mechanisms for controlling the operation of jitter clock component 116. In the event that no obfuscation is desired (i.e., "No" at decision D1), system 100 may drive logic circuit 102 using the first clock edge from clock 112 (i.e., as indicated by the line to process P6). In the event that obfuscation is desired (i.e., "Yes" at decision D1), the method may proceed to further steps for varying the clock edge. In some cases (e.g., where jitter switch 122 is omitted from system 100 or permanently turned on), decision D1 may be omitted.

Process P2, in methods according to embodiments of the disclosure, may include generating a non-deterministic value via clock controller 120. As described elsewhere herein, the non-deterministic value may be generated with any currently known or later developed randomizing component such as an RNG, PUF, etc. The non-deterministic value may be transmitted to jitter clock component 116, e.g., as an encoded electrical signal. In process P3, jitter clock component 116 uses the non-deterministic value to produce a clock signal 118 with a second clock edge, e.g., by choosing from one of several possible clock signals with distinct clock edges. The conversion may be implemented, e.g., using mux 150 (FIG. 4) and/or any currently known or later developed digital solution for correlating non-deterministic values with possible clock signals for transmission to logic circuit 102. In a simplified example, methods of the disclosure may proceed to further operations for outputting the clock signal with the second clock edge to logic circuit 102 (i.e., as indicated by phantom line to process P5), as discussed elsewhere herein.

In some implementations, methods of the disclosure may include further processes to ensure that timing for the second clock edge, as converted from the non-deterministic value, is within a jitter limit for logic circuit 102. Process P4 may include, e.g., evaluating the jitter limit for logic circuit 102. The jitter limit may be pre-recorded in jitter controller 124, and/or may be actively calculated with jitter controller 124 based on various properties of logic circuit 102. However evaluated, process P4 may output the maximum allowable jitter for operating logic circuit 102 with sufficient time for signal propagation from set of source latches 104 to set of capture latches 106. Thereafter, jitter controller 124 may implement decision D2 of determining whether the second clock edge from process P3 is within the jitter limit evaluated in process P4. Where the second clock edge is not within the jitter limit (i.e., "No" at decision D2), jitter controller 124 may cause clock controller to generate a new non-deterministic value (i.e., process P2 repeats) to select a new second clock edge for evaluation. Where the second clock edge is within the jitter limit (i.e., "Yes" at decision D2), the clock signal with the second clock edge can be used to drive each set of latches 104, 106 as discussed herein. In further implementations, jitter clock component 116 may be structured such that it never causes the second clock edge to be outside the jitter limit for logic circuit 102.

Process P5 in methods according to embodiments of the disclosure may include outputting clock signal 118 from variable control system 110, with the second clock edge, to drive the operation of latches 104, 106. The second clock edge is chosen at non-deterministically based on the non-deterministic value generated in process P2, and thus obfuscates the processing of signals in logic circuit 102 while retaining a desired frequency. Process P6 in methods according to the disclosure may include transmitting clock signal 118 to sets of latches 104, 106 in any conceivable manner, e.g., through clock buffers 130. In cases where processes P2-P5 and/or decision D2 are omitted (i.e., "No" at decision D1), process P6 may include driving logic circuit 102 with clock signal(s) with only a fixed set of clock edges.

Embodiments of the disclosure provide various technical and commercial advantages, some of which are described herein by way of example. Systems and methods according to the disclosure provide an architecture for selectively obfuscating the functions and/or signal pathways of logic circuit 102, without otherwise modifying the structure of logic circuit 102 and/or the clock frequency. System 100 may be coupled to as many or as few logic circuits 102 as desired in a single device, thus allowing the function of sensitive components to be hidden while otherwise preserving space and power consumption in non-sensitive parts of a device. In an example implementation, a single device may include several logic circuits that are not connected to embodiments of system 100, while also including several logic circuits 102 coupled to embodiments of system 100 as discussed herein. Thus, methods according to the disclosure may include operating non-targeted logic circuits 102 with deterministic clock edges while operating other logic circuits 102 with clock edge variation via embodiments of system 100 and/or methods described herein.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As used herein, the term "configured," "configured to" and/or "configured for" can refer to specific-purpose patterns of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The descriptions of the various embodiments of the present disclosure have been presented for purposes of illustration, but mended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a clock coupled to a logic circuit, the logic circuit having a set of source latches coupled to a set of capture latches through a set of logic cones, wherein the clock includes:
      a fixed clock component configured to generate a clock signal having a first clock edge, and a jitter clock component coupled to the fixed clock component and configured to modify the clock signal to have a second clock edge based on a non-deterministic value, wherein the clock transmits the clock signal with the second clock edge to drive the set of source latches and the set of capture latches of the logic circuit; and a clock controller coupled to the jitter clock component, wherein the clock controller generates the non-deterministic value.

2. The system of claim 1, wherein the clock controller is configured to enable the jitter clock component in response to a detecting a command to obfuscate the logic circuit.

3. The system of claim 1, wherein the clock controller includes a physical unclonable function (PUF) for generating the non-deterministic value.

4. The system of claim 1, wherein the clock controller includes a random number generator (RNG) for generating the non-deterministic value.

5. The system of claim 1, wherein the jitter clock component is further configured to modify the clock signal such that the second clock edge is within a jitter limit for the logic circuit.

6. The system of claim 5, wherein each of a plurality of signal paths through the set of logic cones has a slack that is greater than a propagation time from the set of source latches to the set of capture latches with the second clock edge.

7. The system of claim 1, wherein the clock is coupled to the set of source latches and the set of capture latches of the logic circuit through a clock buffer configured to delay the clock signal.

8. A system, comprising:
a set of source latches configured to propagate an input logic signal;
a set of logic cones coupled to the set of source latches, and configured to convert the input logic signal into an output logic signal via one of a plurality of signal paths;
a set of capture latches coupled to the set of logic cones, and configured to process the output logic signal from the set of logic cones;
a clock coupled to the set of source latches and the set of capture latches, the clock including:
a fixed clock component configured to generate a clock signal having a first clock edge, and
a jitter clock component coupled to the fixed clock component and configured to modify the clock signal to have a second clock edge based on a non-deterministic value,
wherein the clock transmits the clock signal with the second clock edge to drive the set of source latches and the set of capture latches; and
a clock controller coupled to the jitter clock component, wherein the clock controller generates the non-deterministic value.

9. The system of claim 8, wherein the plurality of signal paths of the set of logic cones includes a first signal path for the clock signal with the second clock edge, and a second signal path for the clock signal with the second clock edge.

10. The system of claim 8, wherein the clock controller comprises one of a physical unclonable function (PUF) or a random number generator (RNG).

11. The system of claim 8, wherein each of a plurality of signal paths through the set of logic cones has a slack that is greater than a propagation time from the set of source latches to the set of capture latches with the second clock edge.

12. The system of claim 8, wherein the jitter clock component is further configured to modify the clock signal such that the second clock edge is within a jitter limit for the logic circuit.

13. The system of claim 12, wherein each of a plurality of signal paths through the set of logic cones has a slack that is greater than a propagation time from the set of source latches to the set of capture latches with the second clock edge.

14. The system of claim 8, further comprising a clock buffer coupled between the clock and each of the set of source latches and the set of capture latches, the clock buffer being configured to delay the clock signal.

15. A method comprising:
generating a clock signal having a first clock edge;
generating a non-deterministic value via a clock controller;
modifying the clock signal from the first clock edge to a second clock edge based on the non-deterministic value; and
transmitting the clock signal with the second clock edge to a logic circuit having a set of source latches coupled to a set of capture latches through a set of logic cones, such that the clock signal with the second clock edge drives each of the set of source latches and the set of capture latches.

16. The method of claim 15, wherein modifying the clock signal from the first clock edge to the second clock edge causes the set of logic cones to modify a signal path from the set of source latches to the set of capture latches.

17. The method of claim 15, wherein the clock controller includes one of a physical unclonable function (PUF) or a random number generator (RNG).

18. The method of claim 15, further comprising:
calculating a jitter limit for the clock signal based on the logic circuit; and
generating the non-deterministic value such that the second clock edge within the jitter limit for the logic circuit.

19. The method of claim 15, further comprising enabling the clock controller in response to detecting a command to obfuscate the logic circuit.

20. The method of claim 15, wherein transmitting the clock signal with the second clock edge to the logic circuit includes passing the clock signal through a clock buffer to delay the clock signal.

* * * * *

UNITED STATES PATENT AND TRADEMARK OFFICE
CERTIFICATE OF CORRECTION

PATENT NO. : 11,054,854 B1  
APPLICATION NO. : 17/032027  
DATED : July 6, 2021  
INVENTOR(S) : Sebastian T. Ventrone and Jonathan Kantarovsky Page 1 of 1

It is certified that error appears in the above-identified patent and that said Letters Patent is hereby corrected as shown below:

In the Specification

At Column 10, Lines 48-49, the sentence:  
"...presented for the purposes of illustration, but mended to be exhaustive..."  
Should be:  
"...presented for the purposes of illustration, but are not intended to be exhaustive..."

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*